(12) United States Patent
Kauffman

(10) Patent No.: US 8,570,990 B2
(45) Date of Patent: Oct. 29, 2013

(54) TRAVEL CHARACTERISTICS-BASED AD-HOC COMMUNICATION NETWORK ALGORITHM SELECTION

(75) Inventor: Donald C. Kauffman, Laurel, MD (US)

(73) Assignee: Honeywell International Inc., Morristown, NJ (US)

( * ) Notice: Subject to any disclaimer, the term of this patent is extended or adjusted under 35 U.S.C. 154(b) by 918 days.

(21) Appl. No.: 11/950,218

(22) Filed: Dec. 4, 2007

(65) Prior Publication Data
US 2009/0141669 A1 Jun. 4, 2009

(51) Int. Cl.
*H04W 4/00* (2009.01)
*G06F 15/173* (2006.01)

(52) U.S. Cl.
USPC .................. 370/338; 709/238; 709/241

(58) Field of Classification Search
USPC ........................................ 370/338
See application file for complete search history.

(56) References Cited

U.S. PATENT DOCUMENTS

| | | | |
|---|---|---|---|
| 4,414,661 A | 11/1983 | Karlstrom | |
| 4,901,307 A | 2/1990 | Gilhousen et al. | |
| 5,095,480 A | 3/1992 | Fenner | |
| 5,530,909 A | 6/1996 | Simon et al. | |
| 5,710,764 A | 1/1998 | Yoshimura et al. | |
| 5,835,059 A | 11/1998 | Nadel et al. | |
| 6,018,659 A | 1/2000 | Ayyagari | |
| 6,047,165 A | 4/2000 | Wright et al. | |
| 6,064,335 A | 5/2000 | Eschenbach | |
| 6,084,870 A | 7/2000 | Wooten | |
| 6,104,712 A | 8/2000 | Robert et al. | |
| 6,108,539 A | 8/2000 | Ray et al. | |
| 6,147,980 A | 11/2000 | Yee et al. | |
| 6,148,179 A | 11/2000 | Wright | |
| 6,154,636 A | 11/2000 | Wright et al. | |
| 6,160,998 A | 12/2000 | Wright et al. | |
| 6,163,681 A | 12/2000 | Wright et al. | |
| 6,173,230 B1 | 1/2001 | Camus et al. | |
| 6,181,990 B1 | 1/2001 | Grabowsky et al. | |
| 6,195,189 B1 | 2/2001 | Nishihata et al. | |
| 6,259,379 B1 | 7/2001 | Paterson et al. | |

(Continued)

FOREIGN PATENT DOCUMENTS

| | | |
|---|---|---|
| EP | 967815 | 12/1999 |
| EP | 1793512 | 6/2007 |

(Continued)

OTHER PUBLICATIONS

Adaptive Energy Conserving Algorithms for Neighbor Discovery in Opportunistic Bluetooth Networks, Author: Catalin Drula, Cristina Amza, Franck Rousseau, Andrzej Duda, Published: Jan. 2007, IEEE Journal on Selected Areas in Communications, vol. 25, No. 1.*

(Continued)

*Primary Examiner* — Noel Beharry
(74) *Attorney, Agent, or Firm* — Fogg & Powers LLC

(57) ABSTRACT

A method of operating an ad-hoc communication system is provided. The method comprises determining a pattern type relating to mobile node travel characteristics over a defined traveling region. Based on the pattern type, selecting a neighbor discovery and route determination algorithm. Implementing the neighbor discovery and route determination algorithm on received location and identification mobile node information to determine communication routes to at least one of mobile nodes and stationary communication stations in the ad-hoc communication system.

20 Claims, 5 Drawing Sheets

(56) References Cited

U.S. PATENT DOCUMENTS

| | | |
|---|---|---|
| 6,262,659 B1 | 7/2001 | Korkosz et al. |
| 6,271,768 B1 | 8/2001 | Frazier, Jr. |
| 6,285,878 B1 | 9/2001 | Lai |
| 6,308,044 B1 | 10/2001 | Wright et al. |
| 6,353,779 B1 | 3/2002 | Simon et al. |
| 6,438,468 B1 | 8/2002 | Muxlow et al. |
| 6,477,152 B1 | 11/2002 | Hiett |
| 6,606,055 B2 | 8/2003 | Halsema et al. |
| 6,643,274 B2 | 11/2003 | D'Annunzio |
| 6,677,888 B2 | 1/2004 | Roy |
| 6,744,396 B2 | 6/2004 | Stone et al. |
| 6,778,825 B2 | 8/2004 | Parkman |
| 6,781,513 B1 | 8/2004 | Korkosz et al. |
| 6,788,935 B1 | 9/2004 | McKenna et al. |
| 6,795,408 B1 | 9/2004 | Hiett |
| 6,810,527 B1 | 10/2004 | Conrad et al. |
| 6,816,728 B2 | 11/2004 | Igloi et al. |
| 6,819,670 B1 | 11/2004 | Fenner |
| 6,915,189 B2 | 7/2005 | Igloi et al. |
| 6,925,088 B1 | 8/2005 | Moreaux |
| 6,931,248 B2 | 8/2005 | Borel |
| 6,940,832 B2 | 9/2005 | Saadawi et al. |
| 6,965,816 B2 | 11/2005 | Walker |
| 6,970,444 B2 | 11/2005 | Chwieseni et al. |
| 6,990,319 B2 | 1/2006 | Wright et al. |
| 7,027,812 B2 | 4/2006 | Dastrup et al. |
| 7,072,977 B1 | 7/2006 | Bernard et al. |
| 7,085,290 B2 * | 8/2006 | Cain et al. ............ 370/469 |
| 7,085,562 B1 | 8/2006 | Holder et al. |
| 7,116,266 B1 | 10/2006 | Vesel et al. |
| 7,177,939 B2 | 2/2007 | Nelson et al. |
| 7,181,160 B2 | 2/2007 | Barrett |
| 7,187,927 B1 | 3/2007 | Mitchell |
| 7,343,157 B1 | 3/2008 | Mitchell |
| 7,398,050 B2 | 7/2008 | Walker |
| 7,454,203 B2 | 11/2008 | Levitan |
| 7,463,890 B2 | 12/2008 | Herz et al. |
| 7,519,014 B2 | 4/2009 | Allen et al. |
| 7,599,314 B2 | 10/2009 | Wittenschlaeger |
| 7,633,873 B1 | 12/2009 | Kohler |
| 7,643,426 B1 | 1/2010 | Lee |
| 7,751,815 B2 | 7/2010 | McKenna et al. |
| 7,756,508 B1 | 7/2010 | Usher et al. |
| 7,769,028 B2 | 8/2010 | Boley et al. |
| 7,814,322 B2 | 10/2010 | Gurevich et al. |
| 7,876,736 B2 | 1/2011 | Inoue |
| 7,894,475 B2 | 2/2011 | Bishop et al. |
| 7,907,893 B2 | 3/2011 | Karabinis et al. |
| 7,940,669 B2 | 5/2011 | Vaswani et al. |
| 2002/0009993 A1 | 1/2002 | Dastrup et al. |
| 2002/0168971 A1 | 11/2002 | Parkman |
| 2002/0191573 A1 | 12/2002 | Whitehill et al. |
| 2003/0003872 A1 | 1/2003 | Brinkley et al. |
| 2003/0071743 A1 | 4/2003 | Seah et al. |
| 2003/0072252 A1 | 4/2003 | Gurney |
| 2003/0073406 A1 | 4/2003 | Benjamin |
| 2003/0158963 A1 | 8/2003 | Sturdy |
| 2003/0231574 A1 | 12/2003 | Okuda et al. |
| 2004/0008253 A1 | 1/2004 | Monroe |
| 2004/0028003 A1 | 2/2004 | Diener et al. |
| 2004/0132495 A1 | 7/2004 | Horton, Jr. et al. |
| 2004/0235469 A1 | 11/2004 | Krug |
| 2005/0026609 A1 | 2/2005 | Brinkley et al. |
| 2005/0053026 A1 | 3/2005 | Mullan et al. |
| 2005/0054346 A1 | 3/2005 | Windham et al. |
| 2005/0064895 A1 | 3/2005 | Oesterling et al. |
| 2005/0090201 A1 | 4/2005 | Lengies et al. |
| 2005/0108374 A1 | 5/2005 | Pierzga et al. |
| 2005/0143013 A1 | 6/2005 | Jha |
| 2005/0174950 A1 | 8/2005 | Ayyagari |
| 2005/0197748 A1 | 9/2005 | Holst et al. |
| 2005/0220055 A1 | 10/2005 | Nelson et al. |
| 2005/0221814 A1 | 10/2005 | Fagan et al. |
| 2005/0221818 A1 | 10/2005 | Johnson et al. |
| 2005/0232185 A1 | 10/2005 | Hudson et al. |
| 2005/0234788 A1 | 10/2005 | Hudson et al. |
| 2005/0281270 A1 | 12/2005 | Kossi |
| 2005/0286452 A1 | 12/2005 | Hardgrave et al. |
| 2006/0023677 A1 | 2/2006 | Labrador et al. |
| 2006/0031394 A1 | 2/2006 | Tazuma |
| 2006/0080451 A1 | 4/2006 | Eckert |
| 2006/0098608 A1 | 5/2006 | Joshi |
| 2006/0167618 A1 | 7/2006 | Werback |
| 2006/0176842 A1 | 8/2006 | Tamura |
| 2006/0178141 A1 | 8/2006 | McGuffin et al. |
| 2006/0183474 A1 | 8/2006 | Ziarno et al. |
| 2006/0205345 A1 | 9/2006 | Ishikawa |
| 2007/0042773 A1 | 2/2007 | Alcorn |
| 2007/0042774 A1 | 2/2007 | Alcorn |
| 2007/0072590 A1 | 3/2007 | Levitan |
| 2007/0150939 A1 | 6/2007 | Aaron |
| 2007/0183435 A1 | 8/2007 | Kettering et al. |
| 2007/0200761 A1 | 8/2007 | Smith |
| 2007/0213009 A1 | 9/2007 | Higashida et al. |
| 2007/0284474 A1 | 12/2007 | Olson et al. |
| 2007/0286097 A1 | 12/2007 | Davies |
| 2007/0297416 A1 | 12/2007 | Boley |
| 2008/0117858 A1 | 5/2008 | Kauffman |
| 2008/0144617 A1 | 6/2008 | Molsberry et al. |
| 2008/0150784 A1 | 6/2008 | Zhang |
| 2008/0151811 A1 | 6/2008 | El-Damhougy et al. |
| 2008/0186897 A1 | 8/2008 | Rune |
| 2008/0186907 A1 | 8/2008 | Yagyuu et al. |
| 2008/0205283 A1 | 8/2008 | McGuffin et al. |
| 2008/0240038 A1 | 10/2008 | Lynche et al. |
| 2008/0240062 A1 | 10/2008 | Lynch et al. |
| 2008/0274734 A1 | 11/2008 | Kostanic et al. |
| 2008/0291843 A1 * | 11/2008 | Sonnenberg et al. ......... 370/254 |
| 2009/0005041 A1 | 1/2009 | Steinberg |
| 2009/0041041 A1 | 2/2009 | True et al. |
| 2009/0058682 A1 | 3/2009 | True |
| 2009/0077626 A1 | 3/2009 | Leclercq et al. |
| 2009/0092074 A1 | 4/2009 | Jamalipour |
| 2009/0103452 A1 | 4/2009 | Horvath |
| 2009/0103473 A1 | 4/2009 | Foster |
| 2009/0141669 A1 | 6/2009 | Kauffman |
| 2009/0197595 A1 | 8/2009 | Kauffman et al. |
| 2009/0318137 A1 | 12/2009 | Kauffman et al. |
| 2009/0318138 A1 | 12/2009 | Zeng et al. |
| 2010/0057899 A1 | 3/2010 | Henkel |
| 2010/0157905 A1 | 6/2010 | Ahn et al. |
| 2010/0272012 A1 | 10/2010 | Knefelkamp |

FOREIGN PATENT DOCUMENTS

| | | |
|---|---|---|
| EP | 1850543 | 10/2007 |
| EP | 1926234 | 5/2008 |
| WO | 03053013 | 6/2003 |
| WO | 2005069545 | 7/2005 |
| WO | 2007022353 | 2/2007 |
| WO | 2007043827 | 4/2007 |
| WO | 2007054410 | 5/2007 |
| WO | 2007059560 | 5/2007 |
| WO | 2008007861 | 1/2008 |

OTHER PUBLICATIONS

European Patent Office, "Office Action", Mar. 20, 2009, Published in: EP.

Polajnar et al., "Simple and Efficient Protocols for Guaranteed Message Delivery in Wireless Ad-hoc Networks", "Wireless and Mobile Computing, Networking and Communications 2005", Aug. 22, 2005, pp. 93-100, vol. 3, Publisher: IEEE, Published in: Piscataway, NJ.

Sakhaee et al., "Aeronautical ad hoc Networks", "Wireless Communications and Networking Conference", Jan. 1, 2006, pp. 246-251, Publisher: IEEE, Published in: Piscataway, NJ.

Zhou et al., "GeoLANMAR: Geo Assisted Landmark Routing for Scalable, Group Motion Wireless Ad Hoc Networks", "Vehicular Technology Conference 2005", May 30, 2005, pp. 2420-2424, vol. 4, Publisher: IEEE, Published in: Piscataway, NJ.

"The ATN SARPs Third Edition", "Manual of Technical Provisions for the Aeronautical Telecommunications Network—ICAO DOC 9705/AN956", Publisher: ATN.

(56) References Cited

OTHER PUBLICATIONS

Avionica, "Securelink", , pp. 1-2, Publisher: Avionica.
Carlos Jodar et al., "Wi-Fi Gatelink Trial Frankfurt and Muich, Germany White Paper", Aug. 9, 2006, pp. 1-18, Publisher: ARINC Proprietary.
Eklund et al., "IEEE Standard 802.16: A Technical Overview of the Wirelessman Air Interface for Broadband Wireless Access", "IEEE Communications Magazine", Jun. 2002, pp. i-107, Publisher: IEEE.
Hardy et al., "Aircraft Network and File Server—ARINC 763", Oct. 16, 2002, pp. 1-12, Publisher: AEEC (Airlines Electronic Engineering Committee).
"Technical Overview for Mark III Communications Management Unit (CMU)", pp. 1-59, Publisher: Honeywell Aerospace Electronic Systems.
Hurlburt et al., "A Data Communications Concept for a SATS Scenario", "4th Integrated CNS Technologies Conference and Workshop", Apr. 2004, pp. 1-20.
Ivancic, "Modular, Cost-Effective, Extensible Avionics Architecture for Secure Mobile Communications", "2006 IEEE Aerospace Conference—Mar. 4-11, 2006 Big Sky, Montana", 2006, pp. 1-9, Publisher: IEEE.
Teledyne Technologies Inc., "Wireless Groundlink System (WGL)", "www.teledyne-controls.com/productsolution.wirelessgroundlink.groundlink.asp", 2007, pp. 1-2, Publisher: Teledyne Technologies Inc.
Teledyne Technologies Inc., "New Release", "www.teledyne-controls.com/newscenter/sco.asp", 2007, pp. 1-2, Publisher: Teledyne Technologies Inc.
Mouza et al., "Mobility Patterns", "Proceedings of the Second Workshop on Spatio-Temporal Database Management", Jul. 23, 2004, Published in: Toronto, Canada.
Samal, "Mobility Pattern Aware Routing in Mobile Ad Hoc Networks", May 2003, Publisher: Virginia Polytechnic Institute and State University , Published in: Blacksburg, Virginia.
Vyas et al. , "Location and Mobility Pattern Based Routing Algorithm for Mobile Ad Hoc Wireless Networks", "http://www.scs.org/getDoc.cfm?id=2466", 2003, Publisher: The Society for Modeling and Simulation International.
Cordeiro et al., "IEEE 802.22: An Introduction to the First Wireless Standard Based on Congitive Radios", "Journal of Communications", Apr. 2006, pp. 38-47, vol. 1, No. 1, Publisher: Academy Publisher.
European Patent Office, "Office Action", "from Foreign Counterpart of U.S. Appl. No. 11/875,662", May 3, 2012, pp. 1-5, Published in: EP.
European Patent Office, "European Search Report", "from Foreign Counterpart of U.S. Appl. No. 11/875,662", Apr. 5, 2012, pp. 1-3, Published in: EP.
European Patent Office, "Communication under Rule 71(3) EPC", "from Foreign Counterpart of U.S. Appl. No. 11/950,218", Apr. 5, 2011, pp. 1-21, Published in: EP.
European Patent Office, "Extended European Search Report", "from Foreign Counterpart of U.S. Appl. No. 11/950,218", Mar. 20, 2009, pp. 1-6, Published in: EP.
European Patent Office, "Office Action", "from Foreign Counterpart of U.S. Appl. No. 12/025,685", Sep. 11, 2009, p. 1, Published in: EP.
European Patent Office, "Office Action", "from Foreign Counterpart of U.S. Appl. No. 12/025,685", Jan. 23, 2012, pp. 1-6, Published in: EP.
European Patent Office, "Extended European Search Report", "from Foreign Counterpart of U.S. Appl. No. 12/025,685", May 8, 2009, pp. 1-6, Published in: EP.
European Patent Office, "Communication under Rule 71(3) EPC", "from Foreign Counterpart of U.S. Appl. No. 12/143,369", Nov. 26, 2012, pp. 1-27, Published in: EP.
European Patent Office, "European Search Report", "from Foreign Counterpart of U.S. Appl. No. 11/875,660", Apr. 10, 2012, pp. 1-3, Published in: EP.
European Patent Office, "Office Action", "from Foreign Counterpart of U.S. Appl. No. 11/875,660", May 3, 2012, Published in: EP.
European Patent Office, "Office Action", "from Foreign Counterpart of U.S. Appl. No. 11/875,660", Sep. 13, 2012, pp. 1-3, Published in: EP.
U.S. Patent and Trademark Office, "Advisory Action", "U.S. Appl. No. 11/875,660", Apr. 14, 2011, pp. 1-3.
U.S. Patent and Trademark Office, "Advisory Action", "U.S. Appl. No. 11/875,660", Feb. 22, 2012, pp. 1-13.
U.S. Patent and Trademark Office, "Examiner's Answer", "U.S. Appl. No. 11/875,660", Aug. 16, 2012, pp. 1-16.
U.S. Patent and Trademark Office, "Final Office Action", "U.S. Appl. No. 11/875,660", Feb. 1, 2011, pp. 1-19.
U.S. Patent and Trademark Office, "Final Office Action", "U.S. Appl. No. 11/875,660", Dec. 7, 2011, pp. 1-21.
U.S. Patent and Trademark Office, "Office Action", "U.S. Appl. No. 11/875,660", Sep. 17, 2010, pp. 1-36.
U.S. Patent and Trademark Office, "Office Action", "U.S. Appl. No. 11/875,660", Jun. 20, 2011, pp. 1-16.
U.S. Patent and Trademark Office, "Pre-Appeal Brief Decision", "U.S. Appl. No. 11/875,660", Apr. 23, 2012, pp. 1-2.
U.S. Patent and Trademark Office, "Advisory Action", "U.S. Appl. No. 11/875,662", May 20, 2010, pp. 1-3.
U.S. Patent and Trademark Office, "Examiner's Answer", "U.S. Appl. No. 11/875,662", Oct. 27, 2010, pp. 1-20.
U.S. Patent and Trademark Office, "Final Office Action", "U.S. Appl. No. 11/875,662", Mar. 17, 2010, pp. 1-30.
U.S. Patent and Trademark Office, "Office Action", "U.S. Appl. No. 11/875,662", Oct. 2, 2009, pp. 1-19.
U.S. Patent and Trademark Office, "Pre-Appeal Brief Decision", "U.S. Appl. No. 11/875,662", Jun. 25, 2010, pp. 1-2.
European Patent Office, "Office Action", "from Foreign Counterpart of U.S. Appl. No. 11/950,218", Sep. 29, 2009, p. 1, Published in: EP.
European Patent Office, "Office Action", "from Foreign Counterpart of U.S. Appl. No. 11/950,218", May 26, 2010, pp. 1-3, Published in: EP.
European Patent Office, "European Search Report", "from Foreign Counterpart of U.S. Appl. No. 12/025,685", May 8, 2009, pp. 1-6, Published in: EP.
U.S. Patent and Trademark Office, "Advisory Action", "U.S. Appl. No. 12/025,685", Jun. 1, 2012, pp. 1-2.
U.S. Patent and Trademark Office, "Final Office Action", "U.S. Appl. No. 12/025,685", Mar. 30, 2012, pp. 1-15.
U.S. Patent and Trademark Office, "Office Action", "U.S. Appl. No. 12/025,685", Sep. 28, 2011, pp. 1-28.
U.S. Patent and Trademark Office, "Office Action", "U.S. Appl. No. 12/025,685", Sep. 11, 2012, pp. 1-15.
European Patent Office, "Office Action", "from Foreign Counterpart of U.S. Appl. No. 12/143,369", Nov. 13, 2009, pp. 1-6, Published in: EP.
European Patent Office, "Office Action", "from Foreign Counterpart of U.S. Appl. No. 12/143,369", Jun. 25, 2010, pp. 1-4, Published in: EP.
European Patent Office, "Office Action", "from Foreign Counterpart of U.S. Appl. No. 12/143,369", Apr. 8, 2011, pp. 1-4, Published in: EP.
U.S. Patent and Trademark Office, "Final Office Action", "U.S. Appl. No. 12/143,369", Sep. 20, 2011, pp. 1-16.
U.S. Patent and Trademark Office, "Notice of Allowance", "U.S. Appl. No. 12/143,369", Apr. 12, 2012, pp. 1-12.
U.S. Patent and Trademark Office, "Office Action", "U.S. Appl. No. 12/143,369", Apr. 14, 2011, pp. 1-34.
U.S. Patent and Trademark Office, "Office Action", "U.S. Appl. No. 12/143,369", Dec. 9, 2011, pp. 1-17.

* cited by examiner

TRAVEL CHARACTERISTICS-BASED AD-HOC COMMUNICATION NETWORK ALGORITHM SELECTION

BACKGROUND

Moving vehicles that that form ad-hoc communication networks to communicate between themselves require a means to determine neighbor vehicle locations in forming the ad-hoc communication network. One method used to determine neighbor vehicle locations is through message exchange wherein the messages include location information and ID information of the nodes (vehicles). Algorithms are applied to the received messages to perform neighbor discovery and routing determinations. However, the overhead (location and ID information) needed in each message for neighbor discovery and routing determinations can take up a large amount of the bandwidth. This limits the amount of other (payload data) that can be sent. Moreover, the complexity of algorithms can use up a lot of processing resources. It is desired to minimize the amount of bandwidth and processing resources used in forming an ad-hoc communication network so that resources can be freed up for other functions.

For the reasons stated above and for other reasons stated below which will become apparent to those skilled in the art upon reading and understanding the present specification, there is a need in the art for an effective and efficient method of forming and operating an ad-hoc communication network.

SUMMARY OF INVENTION

The above-mentioned problems of current systems are addressed by embodiments of the present invention and will be understood by reading and studying the following specification. The following summary is made by way of example and not by way of limitation. It is merely provided to aid the reader in understanding some of the aspects of the invention.

In one embodiment, a method of operating an ad-hoc communication system is provided. The method comprises determining a pattern type relating to mobile node travel characteristics over a defined traveling region. Based on the pattern type, the method continues by selecting a neighbor discovery and route determination algorithm. The final step in this method is implementing the neighbor discovery and route determination algorithm on received location and identification mobile node information to determine communication routes to at least one of mobile nodes and stationary communication stations in the ad-hoc communication system.

BRIEF DESCRIPTION OF THE DRAWINGS

The present invention can be more easily understood and further advantages and uses thereof more readily apparent, when considered in view of the detailed description and the following figures in which.

In accordance with common practice, the various described features are not drawn to scale but are drawn to emphasize specific features relevant to the present invention. Reference characters denote like elements throughout Figures and text.

DETAILED DESCRIPTION

In the following detailed description, reference is made to the accompanying drawings, which form a part hereof, and in which is shown by way of illustration specific embodiments in which the inventions may be practiced. These embodiments are described in sufficient detail to enable those skilled in the art to practice the invention, and it is to be understood that other embodiments may be utilized and that logical, mechanical and electrical changes may be made without departing from the spirit and scope of the present invention. The following detailed description is, therefore, not to be taken in a limiting sense, and the scope of the present invention is defined only by the claims and equivalents thereof.

Embodiments of the present invention provide a method of efficiently implementing an ad-hoc communication network between moving vehicles that is based on select pattern types defined by vehicle traveling characteristics over a defined traveling region. In particular, in embodiments select algorithms are used for neighbor discovery and route planning based on the current traveling characteristics of neighboring vehicles over the then current traveling region. Although, the present invention is described as relating to aircraft it will be understood that any type of mobile nodes that exhibit predictable travel characteristics in relation to other mobile nodes over a traveling region can implement embodiments of the present invention to form an ad-hoc communication network.

Figure 1:
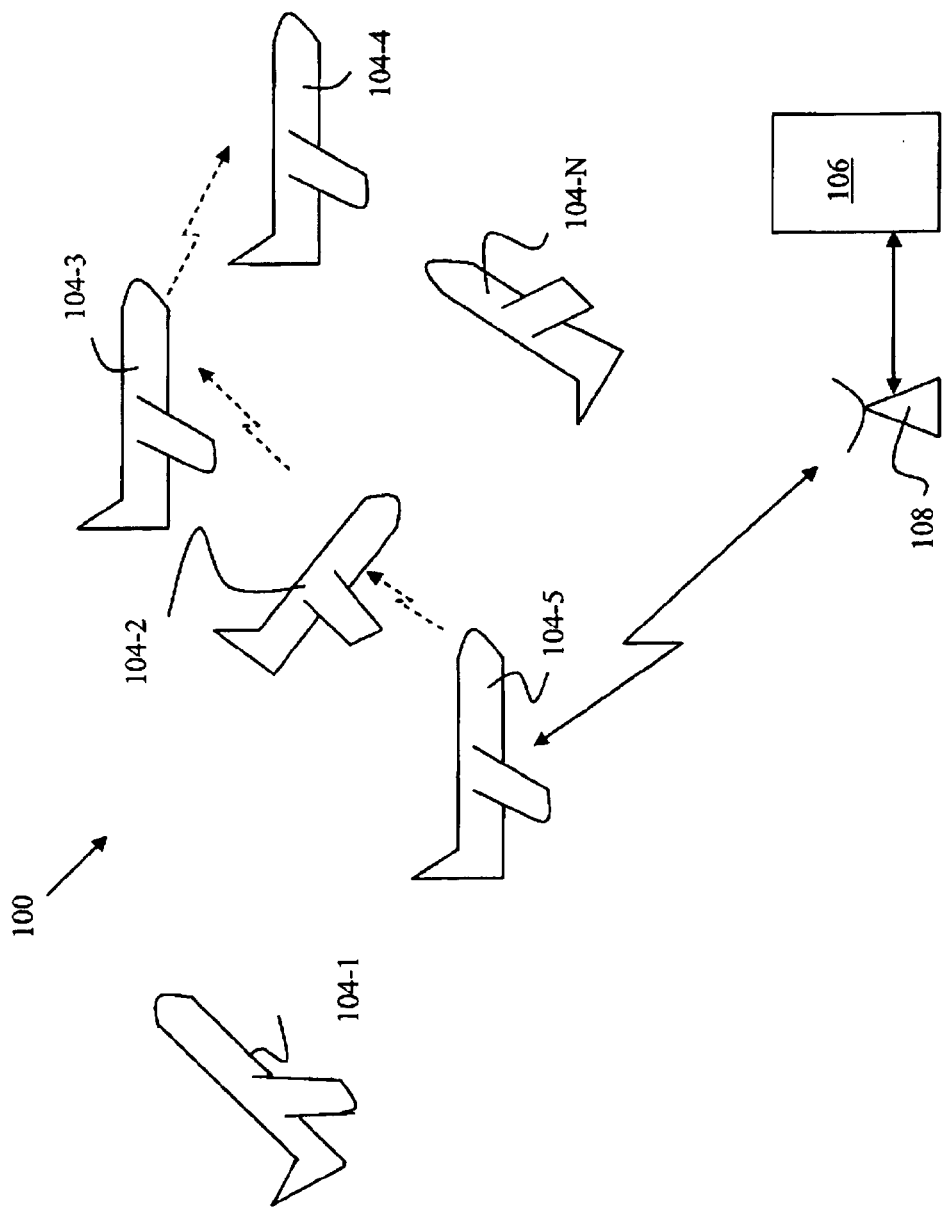
FIG. 1 is an illustration of an ad-hoc communication network of one embodiment of the present invention.

Referring to FIG. 1, an ad-hoc communication network 100 of one embodiment is illustrated. In this embodiment, a plurality of aircraft 104 (1-N) and a ground station 106 make up the communication network 100. In this example, the ground station 106 is to send a message to vehicle 104-4 via antenna 108. However, vehicle 104-4 is beyond the communication range of the of the ground station 106. To deliver the message to the intended vehicle, an ad-hoc communication network of the vehicles 104 (1-N) is formed. As FIG. 1, illustrates, the ad-hoc communication network passes the message from vehicle 104-5, which is in communication range of the ground station 106, to vehicle 104-2, then to vehicle 104-3 and then to destination vehicle 104-4. The determination of the ad-hoc communication network between the vehicles 104 (1-N) (or nodes) is done with algorithms. In particular, algorithms are used to determine neighbor discovery and route determinations. In one embodiment, the vehicles exchange messages with overhead (location information and ID information of the nodes) to determine the topology of the network. In another embodiment, surveillance equipment in each node is used to provide all or a portion of the location and ID information. As discussed above, in embodiments, characteristics of the travel paths of the vehicles over a defined region are used to implement algorithms that are efficient based on the situation.

Figure 2:
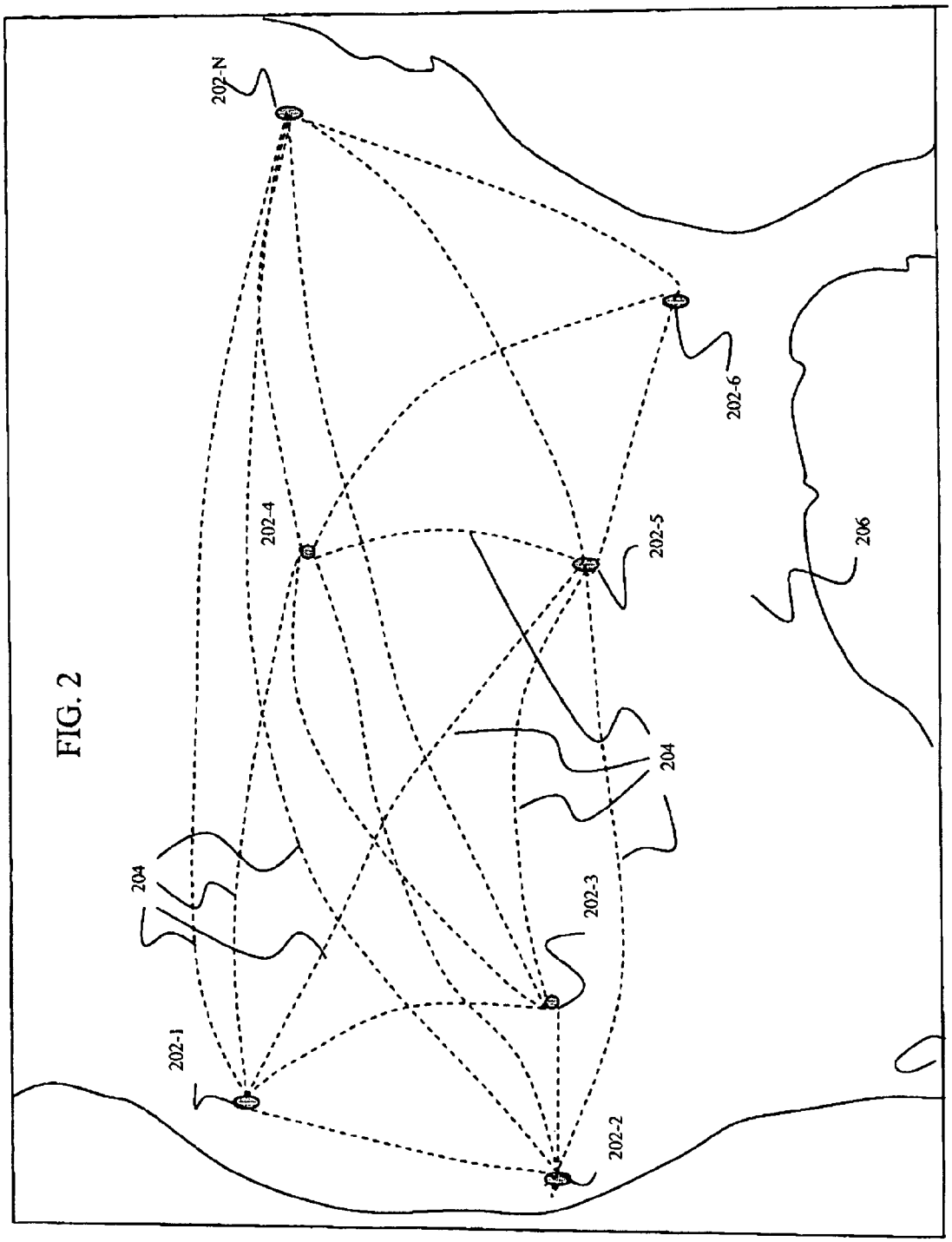
FIG. 2 is an illustration of a fight routes over a land mass.
Figure 3:
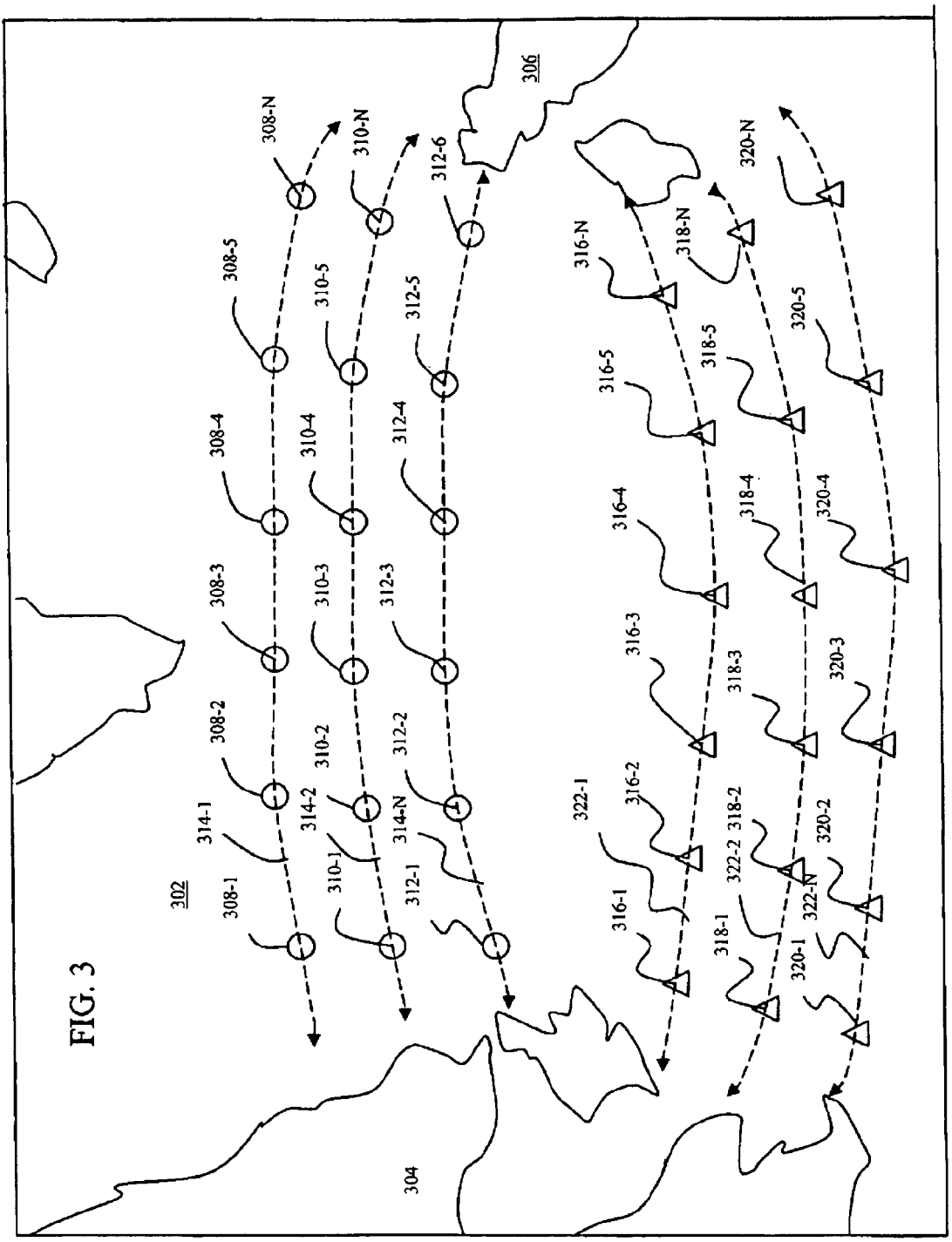
FIG. 3 is an illustration of fight routes over an ocean.

In FIG. 1, it is illustrated that the aircrafts 104 (1-N) are traveling in different paths in relation to each other. This is a situation that is encountered over a land mass 206 (a defined region) as illustrated in FIG. 2. In FIG. 2, an example of flight paths 204 over a land mass is illustrated. As this example illustrates, the flight paths 204 between hubs 202 (1-N) dictate that the aircraft (or nodes) will cross paths at all different angles. Hence, there is a high rate of neighbor change in this situation. Algorithms to determine topology and routing in this situation need to be fairly complex. In contrast, FIG. 3 illustrates flight paths 314 (1-N) and 322 (1-N) over a body of water 302 such as an ocean 302. Typically each flight path 314 (1-N) and 322 (1-N) is defined by points (latitude and longitude) through which the aircraft must pass in traversing over the ocean. In the example, of FIG. 3, flight path 314-1 includes points 308 (1-N), flight path 314-2 includes points 310 (1-N), flight path 314-N includes points 312 (1-N), flight path 322-1 includes points 316 (1-N), flight path 322-2 includes points 318 (1-N) and flight path 322-N includes points 320 (1-N). In this type of arrangement, the aircraft are moving in a convoy-like behavior and although, aircraft may be flying at different altitudes, neighboring aircraft are typically moving in the same direction at about the same speed. Hence, knowing the characteristics of this situation, algorithms that determine neighbors and routing can be implemented that are not relatively complex. Moreover, in this situation, since neighboring aircraft are not going to change often, the algorithms need not perform neighbor discovery often. This frees up resources of the aircraft's communication system for other functions such as communicating payload messages. FIGS. 2 and 3 illustrate examples of flight patterns that differ greatly. They are used to illustrate that different algorithms could be employed for neighbor discovery and routing. Other types of flight patterns are also contemplated, which will include specific algorithms defined to exploit their characteristics so that efficient and effective communication systems are created for each situation.

Figure 4:
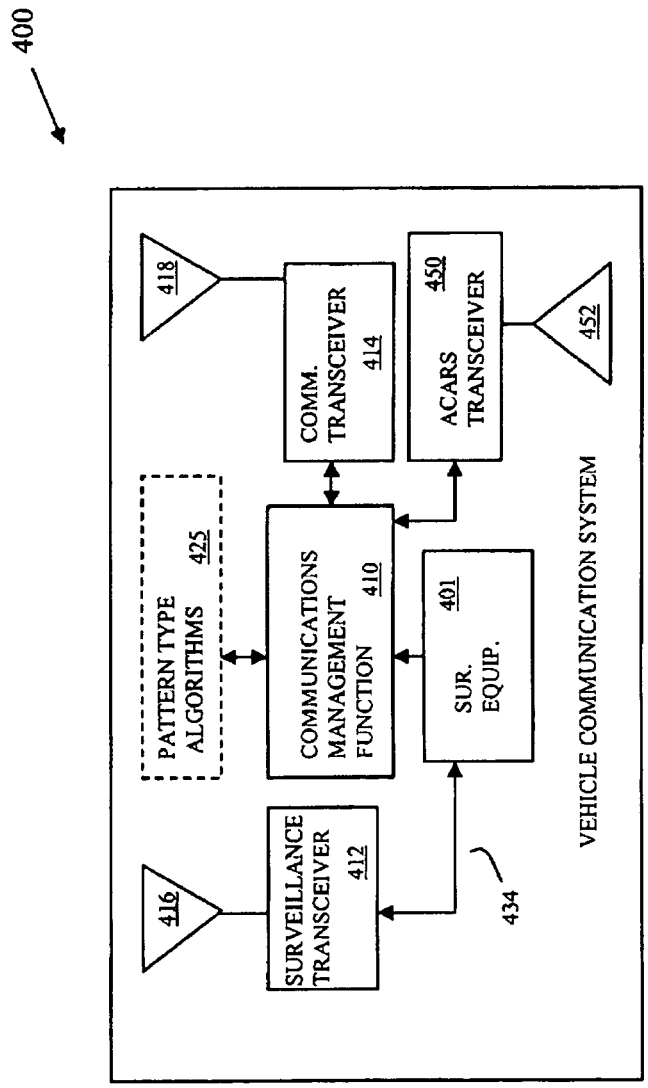
FIG. 4 is block diagram of vehicle communication system of one embodiment of the present invention.

Referring to FIG. 4, a vehicle communication system 400 of one embodiment of a vehicle of the present invention is provided. In this embodiment, the communication system 400 includes an Aircraft Communication Addressing and Reporting System (ACARS) transceiver 450 which provides communication between the communication system 400 and a ground station via antenna 452. The ACARS transceiver 450 is a data link communications transceiver that provides for the communication of relatively small messages via radio or satellite signals. Also included in the communication system is a communication transceiver 414 that communicates with other vehicles via antenna 418. Further, the communication system 400 includes surveillance equipment 401. The surveillance equipment 401 is used to transmit and receive, via the surveillance transceiver 412 and antenna 416, at least position and ID information. Hence, the surveillance equipment 401 sends its position and its ID information and receives position and ID information from other aircraft surveillance equipment. This information is then used by other aircraft for collision avoidance reasons. In some embodiments, the surveillance information is also used to determine the position and ID information needed for neighbor discovery and route determination. In these embodiments, the position and ID information for the other aircraft is sent from the surveillance equipment 401 to the communications management function 410. The communication system 400 includes a communication management function (CMF) 410. The CMF 410 controls the functions of the communication system 400. In embodiments of the present invention, the CMF 410 selects pattern type algorithms 425 used to determine topology of a communication network and routing paths based on the pattern type of airspace the communication system 400 is currently traversing.

As one skilled in the art will realize, it is not necessary to use surveillance equipment 401, surveillance transceiver 412 and antenna 416 to determine position and ID information of other vehicles in the ad-hoc network, this information can be derived from information sent via antenna 418 and the communications transceiver 414.

Moreover, as one skilled in the art will recognize, it is not necessary to have a separate ACARS transceiver 450 and antenna 452 as well as a communications transceiver 414 and antenna 418. One of the at least combination ACARS transceiver 450 and antenna 452 and combination communications transceiver 414 and antenna 418 could serve as the air-to-air ad-hoc network communications path and the air-to-ground communications path.

In the case of aircraft, the avionics onboard the aircraft contain the information that serves as indicators to the CMF 410 of the type of airspace the aircraft currently occupies. In embodiments, this information may include but is not limited to an air traffic control message received by the ACARS transceiver 450 where message formats differ in each airspace, position data from the surveillance equipment (navigation equipment) in use with stored maps that set out boundaries for the types of airspace and passive monitoring of transmissions from neighboring aircraft via the communication transceiver 414. In some embodiments the smooth transition between algorithms is employed where uninterrupted connectivity is essential. In one embodiment, uninterrupted connectivity is achieved by continuing to implement algorithms after a change in airspace is detected until a route is established by the algorithms designated for the then current airspace. In other embodiments uninterrupted connectivity is further achieved by switching to a new method and algorithms that yield better performance. This embodiment may be implemented where the network routing and algorithm selections for the airspace where determined as flawed.

Figure 5:
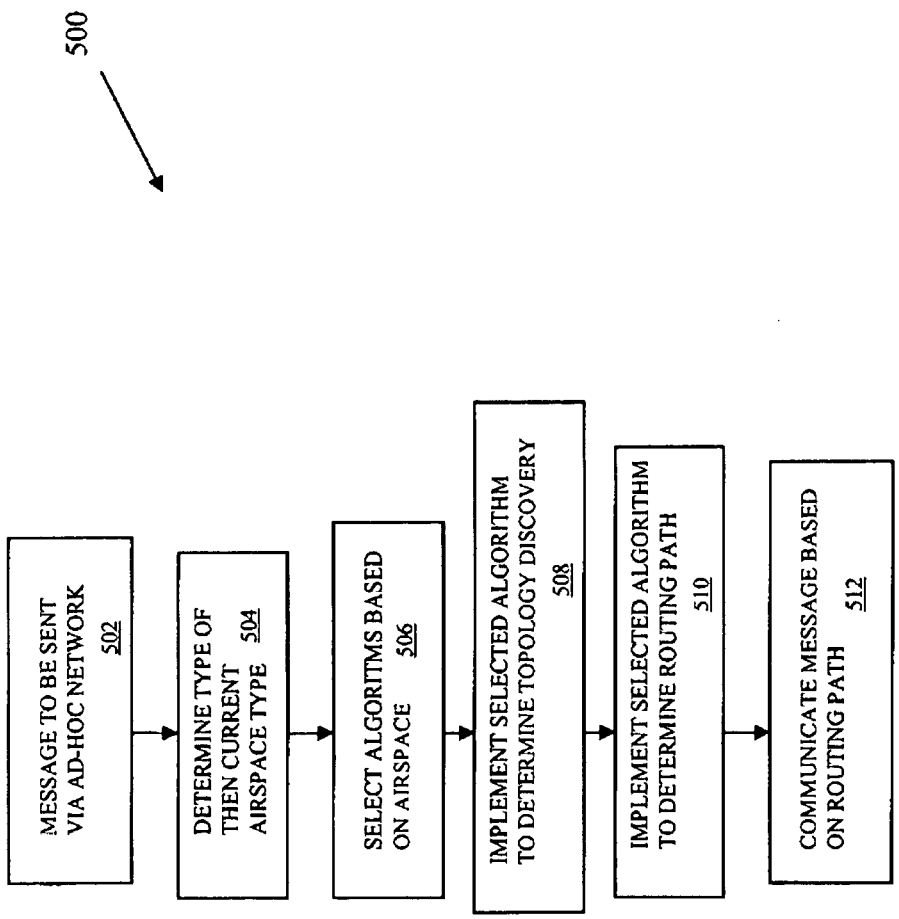
FIG. 5 is an algorithm selection flow diagram illustrating one method of implementing an embodiment of the present invention.

FIG. 5 illustrates an algorithm selection flow diagram 500 of one embodiment of the present invention. As illustrated, this process starts when a message needs to be sent via an ad-hoc network of vehicles, which in this example is aircraft (502). The type of airspace the aircraft is currently in is then determined (504). In one embodiment, the airspace type is continually monitored and determined by the CMF. An example of a method of determining the airspace is provided above. Next, algorithms based on the type of airspace are selected (506). A selected neighbor discovery algorithm is then implemented to determine the topology of the communication network (508). A selected route determination algorithm relating to routing paths is then implemented on the topology to determine the most efficient and reliable route (510). The message is then communicated via the selected route (512). In another embodiment, determining the type of airspace (504), selecting algorithms based on the airspace type (506), implementing the selected algorithm to determine neighbor discovery (508) and implementing the selected algorithm to determine the routing path to one of a select list of destinations or all destinations within the ad-hoc network (510), may operate as a periodically executed, message independent sequence of activities. In this embodiment, when a message is to be sent via ad-hoc network (502), the continuously operating subset of activities would provide the route to the destination and then the message would be sent via that routing path (512).

The methods and techniques used by the CMF as described above in algorithms to determine topology and routing paths can be implemented in digital electronic circuitry, or with a programmable processor (for example, a special-purpose processor or a general-purpose processor such as a computer) firmware, software, or in combinations of them. Apparatus embodying these techniques may include appropriate input and output devices, a programmable processor, and a storage medium tangibly embodying program instructions for execution by the programmable processor. A process embodying these techniques may be performed by a programmable processor executing a program of instructions to perform desired functions by operating on input data and generating appropriate output. The techniques may advantageously be implemented in one or more programs that are executable on a programmable system including at least one programmable processor coupled to receive data and instructions from, and to transmit data and instructions to, a data storage system, at least one input device, and at least one output device. Generally, a processor will receive instructions and data from a read-only memory and/or a random access memory. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and DVD disks. Any of the foregoing may be supplemented by, or incorporated in, specially-designed application-specific integrated circuits (ASICs).

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

The invention claimed is:

1. A method of operating an ad-hoc communication system, the method comprising:
    determining a current path pattern type of a plurality of mobile nodes in the ad-hoc communication system based on travel characteristics of the plurality of mobile nodes over a defined traveling region;
    when the current path pattern type of the plurality of mobile nodes is a first path pattern type where the plurality of mobile nodes have travel paths in different directions that cross at a plurality of angles, selecting a first neighbor discovery algorithm and a first route determination algorithm;
    when the current path pattern type of the plurality of mobile nodes is a second path pattern type where the plurality of mobile nodes have travel paths in the same general direction that generally do not cross, selecting a second neighbor discovery algorithm and a second route determination algorithm; and
    implementing the selected neighbor discovery algorithm and route determination algorithm on location and identification mobile node information to determine at least one communication route to at least one of the plurality of mobile nodes and stationary communication stations in the ad-hoc communication system.

2. The method of claim 1, further comprising:
    determining the location and identification mobile node information via message exchange between the mobile nodes.

3. The method of claim 1, further comprising:
    determining at least part of the location and identification mobile node information via surveillance equipment.

4. The method of claim 1, further comprising:
    maintaining the selected neighbor discovery and routing determination algorithm until a different neighbor discovery and routing determination algorithm is established that is based on the then current path pattern type.

5. The method of claim 1, further comprising:
    passing a message pursuant to a determined communication route based on the neighbor discovery and route determination algorithm.

6. The method of claim 1, wherein the mobile nodes are aircraft; and
    wherein the path pattern types are aircraft flight path pattern types.

7. The method of claim 6, wherein determining the current aircraft flight path pattern type further comprises:
    processing a received air traffic control message, wherein at least one of message formats and message contents differ in different traveling regions.

8. The method of claim 1, wherein determining the current path pattern type further comprises:
    comparing position data with stored map data defining the different traveling regions.

9. The method of claim 1, wherein determining the current path pattern type further comprises:
    monitoring transmissions of neighboring mobile nodes.

10. The method of claim 1, wherein the first path pattern type occurs while the plurality of mobile nodes are generally traveling over a land mass; and
    wherein the second path pattern type occurs while the plurality of mobile nodes are generally traveling over a body of water.

11. A method of operating an ad-hoc communication system, the method comprising:
    determining a current path pattern type of a plurality of mobile nodes in the ad-hoc communication system based on travel characteristics of the plurality of mobile nodes over a defined traveling region;
    when the current path pattern type of the plurality of mobile nodes is a first path pattern type where the plurality of mobile nodes have travel paths in different directions that cross at a plurality of angles, selecting a first neighbor discovery algorithm and a first routing algorithm;
    when the current path pattern type of the plurality of mobile nodes is a second path pattern type where the plurality of mobile nodes have travel paths in the same general direction that generally do not cross, selecting a second neighbor discovery algorithm and a second routing algorithm;
    implementing the selected neighbor discovery algorithm on location and identification mobile node information to determine a topology of the plurality of mobile nodes in the ad-hoc communication system; and
    implementing the selected routing algorithm on the determined topology to determine at least one communication route.

12. The method of claim 11, wherein determining the current path pattern type is done by one of processing a received traffic control message that is indicative of the defined traveling region, comparing position data with stored map data defining different traveling regions, and monitoring transmissions of neighboring mobile nodes.

13. The method of claim 11, further comprising:
    determining the location and identification mobile node information.

14. The method of claim 11, further comprising:
    passing a message pursuant to a determined communication route.

15. A communication system in an ad-hoc network, the communication system comprising:
    a communication transceiver configured to send and receive messages; and
    a communication management function in communication with the communication transceiver, the communication management function configured to apply selected algorithms on mobile node position and ID information to determine neighbor discovery and routing paths of an ad-hoc network including a plurality of mobile nodes, wherein the algorithms are selected based on a current path pattern type defined by paths of the plurality of mobile nodes over a defined traveling region, wherein:

when the current path pattern type of the plurality of mobile nodes is a first path pattern type where the plurality of mobile nodes have travel paths in different directions that cross at a plurality of angles, a first neighbor discovery algorithm and a first route determination algorithm are selected; and when the current path pattern type of the plurality of mobile nodes is a second path pattern type where the plurality of mobile nodes have travel paths in the same general direction that generally do not cross, a second neighbor discovery algorithm and a second route determination algorithm are selected.

16. The communication system of claim 15, wherein the communication transceiver is further configured to send and receive messages including the mobile node position and ID information.

17. The communication system of claim 15, further comprising:

surveillance equipment in communication with the communication management function, the surveillance equipment configured to receive and transmit the mobile node position and ID information.

18. The communication system of claim 17, further comprising:

a surveillance transceiver in communication with the surveillance equipment.

19. The communication system of claim 15, further comprising:

an aircraft communication addressing and reporting system transceiver in communication with the communication management function, the aircraft communication addressing and reporting system transceiver configured to communicate with a ground station.

20. The communication system of claim 15, wherein the first path pattern type occurs while the plurality of mobile nodes are generally traveling over a land mass; and wherein the second path pattern type occurs while the plurality of mobile nodes are generally traveling over a body of water.

* * * * *